United States Patent [19]

Kawahara

[11] Patent Number: 4,527,309
[45] Date of Patent: Jul. 9, 1985

[54] CLASPING DEVICE

[75] Inventor: Akira Kawahara, Kagawa, Japan

[73] Assignee: Ryusyo Industrial Co., Ltd., Osaka, Japan

[21] Appl. No.: 474,638

[22] PCT Filed: Jul. 15, 1982

[86] PCT No.: PCT/JP82/00268
§ 371 Date: Feb. 24, 1983
§ 102(e) Date: Feb. 24, 1983

[87] PCT Pub. No.: WO83/00303
PCT Pub. Date: Feb. 3, 1983

[30] Foreign Application Priority Data

Jul. 16, 1981 [JP] Japan .................. 56-111599

[51] Int. Cl.³ ............................. A44B 21/00
[52] U.S. Cl. ............................. 24/68 CD; 24/69 ST; 254/249; 254/256; 410/103
[58] Field of Search ............... 24/68 R, 68 CD, 68 E, 24/68 T, 68 SB, 69 R, 69 CT, 69 ST, 69 SB, 71 R, 71 TD, 71 SB, 71 ST, 193, 197, 191, 170, 270, 163 R, 302; 254/213-218, 223, 256, 237-240, 248, 249, 380, DIG. 3; 410/11, 12, 20, 21, 100, 101, 103

[56] References Cited

U.S. PATENT DOCUMENTS

| 467,481 | 1/1892 | Hillebrand | 24/68 R X |
| 956,328 | 4/1910 | Forshee | 254/217 X |
| 2,519,536 | 8/1950 | Barbagelata | 74/544 X |
| 2,596,326 | 5/1952 | Coffing | 254/380 X |
| 2,867,406 | 1/1959 | Davis | 24/68 CD X |
| 3,050,799 | 8/1962 | Davis | 24/68 CD |
| 3,120,946 | 2/1964 | McCormack et al. | 24/68 CD |
| 4,451,956 | 6/1984 | Kawahara | 24/68 CD |

FOREIGN PATENT DOCUMENTS

| 2123121 | 11/1971 | Fed. Rep. of Germany ... 24/68 CD |
| 55-10054 | 3/1980 | Japan . |
| 57-27673 | 2/1982 | Japan . |

Primary Examiner—William E. Lyddane
Assistant Examiner—James R. Brittain, Jr.
Attorney, Agent, or Firm—Wenderoth, Lind & Ponack

[57] ABSTRACT

A clasping device for fastening a large cargo which includes a lever pivotally connected to a body through a pair of links. A belt is tightened by pivoting the lever relative to the body in a fastening direction in such a way that the pivotal connection between the links and the lever move in the direction of the interior of the body when the lever is pivoted in a fastening direction, thereby to render the device compact in the fastening position.

11 Claims, 10 Drawing Figures

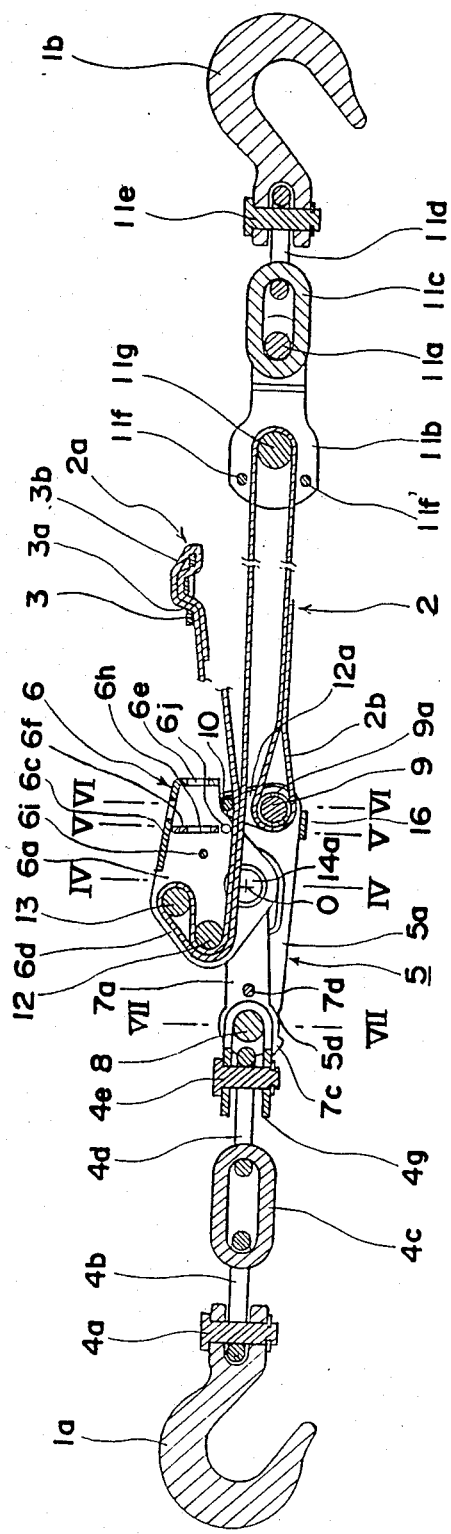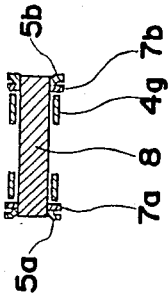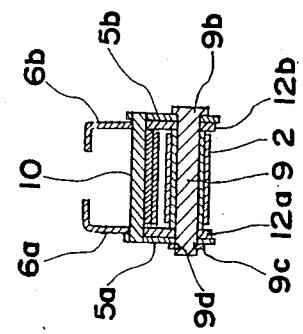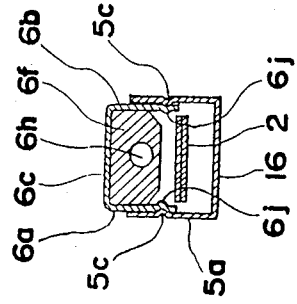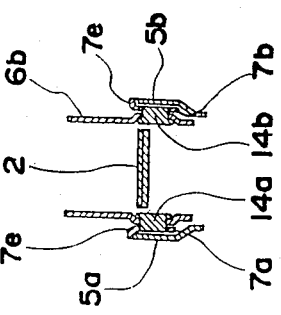

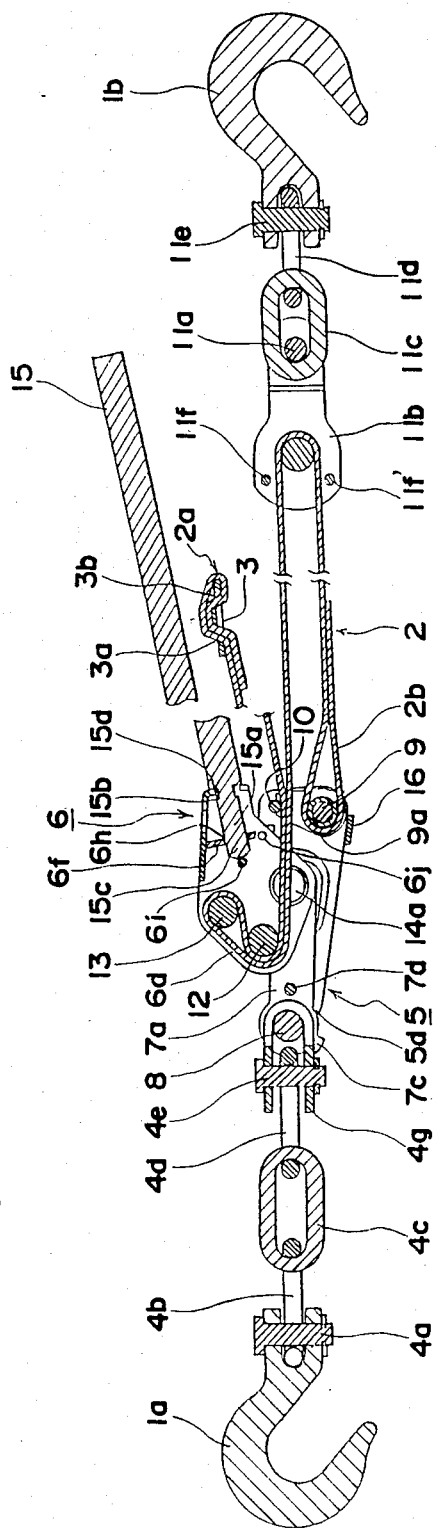
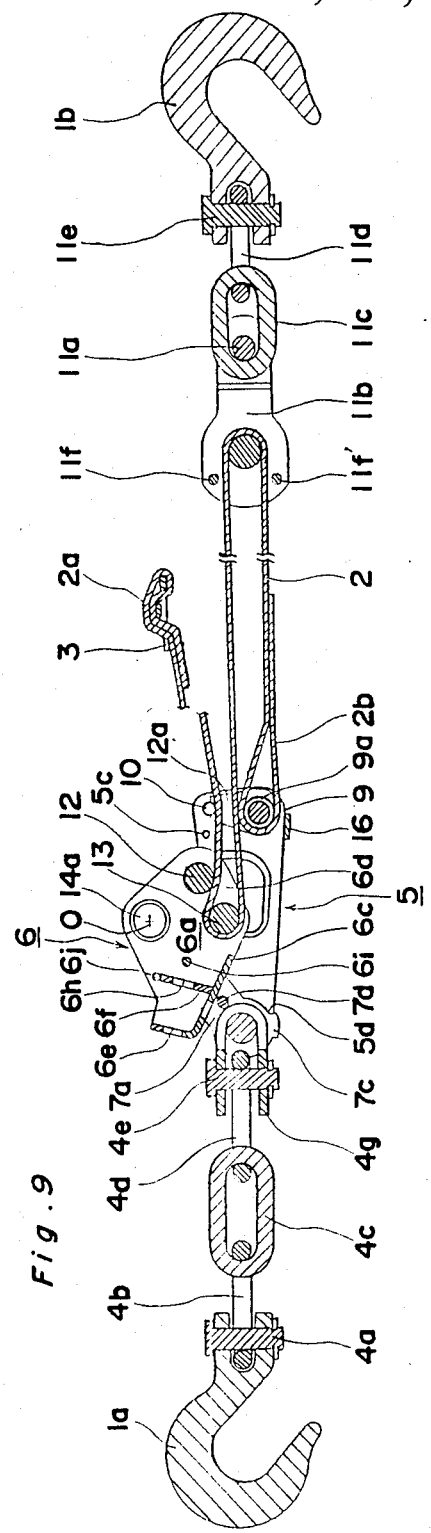
Fig. 8
Fig. 9

CLASPING DEVICE

FIELD OF THE INVENTION

The present invention relates to a clasping device for fixing a cargo item on a base by means of a belt or fastening a belt around a cargo item and, particularly, to a clasping device durable for clasping a large load such as a large size automobile.

BACKGROUND OF THE INVENTION

The present applicant has already provided a clasping device which is compact, tough, reliable in function and easy to handle (Japanese Utility Model Publication No. 56-52175). This clasping device is such that its main member is constituted by a lever so pivotally connected between a body and said main member that, when said lever is pivoted from the release position in a fastening direction, a belt turning shaft and a belt pressing shaft disposed between the walls of the lever move around said pivot shaft to fasten the belt.

The clasping device described above is intended mainly to fix an automobile on a deck aboard a ship when a relatively light-weight passenger car is to be transported aboard the ship, and accordingly, the clasping device itself is relatively compact in size.

In practice, however, it often occurs that a large vehicle of 10 tons or more is transported aboard a ship and, in such a case, the clasping device described above is not suitable. This is because, while the clasping device must be constructed tough enough to withstand the load of a vehicle of 10 tons or more, the clasping main would become very bulky if the structure of the clasping device described above were copied, and would be inconvenient to handle. That is, when the lever is pivoted to a fastening position relative to the body, the belt turning shaft and the belt pressing shaft will be positioned above the pivot shaft and, for this reason, that portion of the lever where these shafts are located project considerably upwardly from the body and, therefore, the height of the clasping main member itself in a fastening condition becomes very high, requiring the main to be constructed long in the lengthwise direction.

The present invention has been developed in the light of the above described conventional situation and has for its object to provide a novel clasping device suited for use with a large load, wherein the lever, when the clasping main is in a fastening condition, can be relatively favorably accommodated within the body and, therefore, the clasping device itself can be constructed relatively compactly.

SUMMARY OF THE INVENTION

The clasping device of the present invention is basically featured in that the lever is not directly mounted on the body, but is mounted on the body through a link so that, when the lever is pivoted relative to the body in a fastening direction, a pivot shaft connecting the link and the lever together moves in a direction in which it sinks into the body and, more particularly, is so designed that a pair of links are pivotally connected at one end by means of pivot shafts to side walls of a lever at positions exteriorly of the lever, and at the other end by means of a connecting shaft to side walls of a body at positions interiorly of the body, a first hook is connected to the connecting shaft of the body through a connecting member, a belt turning shaft and a belt pressing shaft are fixed between the side walls of the lever, and a second hook connected to the other end of a belt while one end of the belt is inserted into the lever exteriorly, turned around the belt turning shaft after having passed the belt passing shaft and led to the outside past the belt pressing shaft, said device being so designed that, when the lever is pivoted from a release position in a fastening direction, the belt turning shaft and the belt passing shaft are turned relative to the pivot shafts to fasten the belt and, at the same time, said pivot shafts move in a direction in which they sink, that is, move between the sidewalls of, the body.

According to the present invention, since in the fastening main member the lever is connected to the body not directly, but through the links, when the lever is pivoted to a fastening position, the connecting shaft connecting the lever and the links together moves in a direction in which it sinks into the body (moves between the sidewalls of the body) with the result that the lever can be accommodated compactly inside the body without projecting considerably upwardly from the body while the lever is in the fastening position and, at the same time, the length dimension of the body in a lateral direction can be minimized, so that the clasping main member as a whole can be rendered compact.

Hereinafter, a preferred embodiment of the present invention will be described.

BRIEF DESCRIPTION OF THE DRAWINGS

FIG. 3 is a cross-sectional view taken along the line III—III in FIG. 1, FIGS. 4, 5, 6 and 7 are cross-sectional views taken along the lines IV—IV, V—V, VI—VI and VII—VII of FIG. 3.

FIG. 8 is a view similar to FIG. 3 showing a condition of the clasping device before completion of the fastening, FIG. 9 is a view similar to FIG. 3 showing the clasping device in a release condition.

It is to be noted that like parts are designated by like reference numerals throughout the drawings.

BEST MODE FOR CARRYING OUT THE INVENTION

Figure 1:
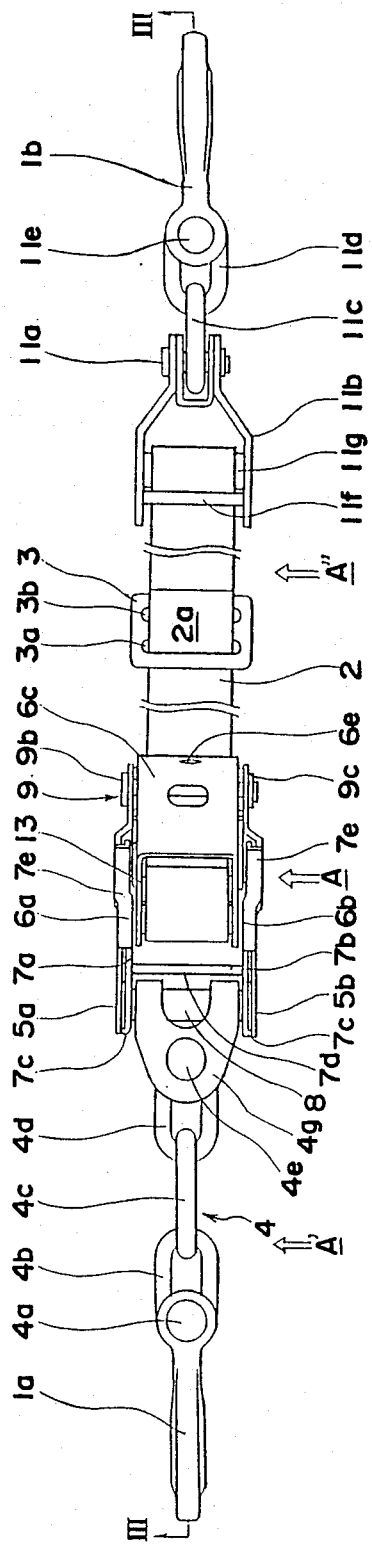
FIGS. 1 and 2 are plan and elevational views showing a fastening condition of a clasping device according to one embodiment of the present invention.
Figure 2:
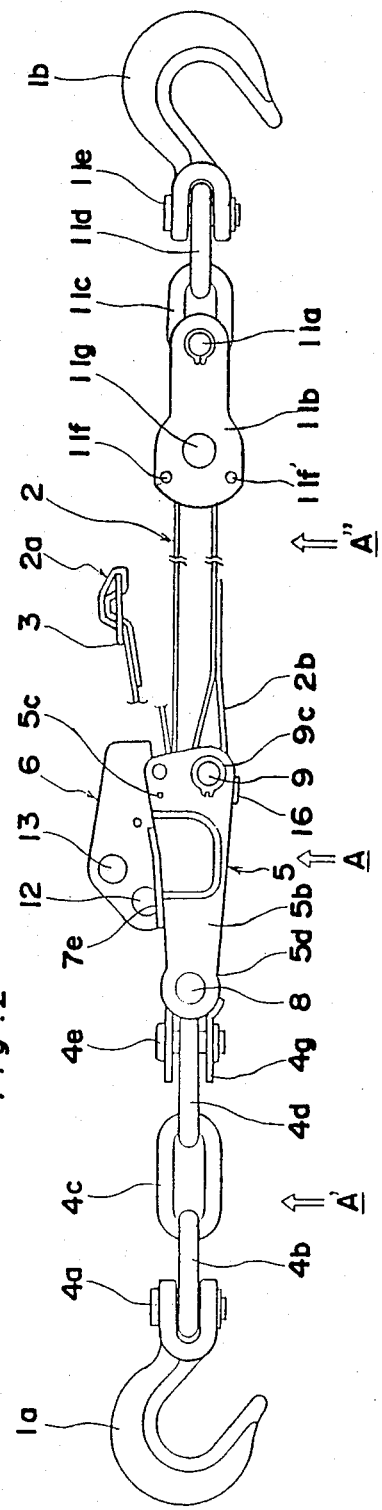

As shown in the Figures, this clasping device is generally constituted by a clasping main member A and two connecting members A' and A" connected to the main member body A, and a lever 6 of the clasping main member A is adapted to be pivoted between a fastening position shown in FIGS. 1, 2 and 3 and a release position shown in FIG. 9.

The main member A is generally constituted by a body 5 and the lever 6 pivotally connected to the body 5 through a pair of links 7a and 7b.

The body 5 includes a pair of opposed laterally long side walls 5a and 5b, a connecting shaft 8 extending between opposing ends of the side walls 5a and 5b, a guide shaft 10 and a connecting shaft 9 extending between the other ends thereof and positioned one above the other, and a connecting plate 16. It is to be noted that each of the side walls 5a and 5b has a cutout stay 5d at a lower portion of one end thereof and, as best shown in FIG. 5, an inwardly extending recess 6j at a predetermined position thereof. Ends of the connecting and guide shafts 8 and 10 are fixed by welding to the side walls 5a and 5b whereas, as best shown in FIG. 6, the connecting shaft 9 has one end formed with a brim 9b and the other end with a circumferential groove 9d and is removably mounted on the side walls 5a and 5b by inserting the end having the circumferential groove 9d onto the side wall 5a with the brim 9b consequently abutting the side wall 5b, and mounting a split ring 9c onto the circumferential groove 9d at a position exteriorly of the side wall 5a. It is also to be noted that the connecting shaft 9 has a rotatable collar 9a mounted thereon and inner faces of the side walls 5a and 5b adjacent the respective ends of the connecting shaft 9 are provided with belt guide plates.

To the connecting shaft 8 is connected the connecting member A'. That is, a U-shaped connector 4g is connected to the connecting shaft 8 on the one hand and is connected with a link 4d inserted between the ends of this connector 4g and connected thereto by means of a pin 4e. To this link 4d is connected other links 4c and 4b in a chain and the link 4b is connected with a stem of a first hook 1a through a pin 4a.

Ends of the pair of the links 7a and 7b are connected to those portions of the connector 8 which are positioned between the opposite sides of the U-shaped connector 4g and the side walls 5a and 5b of the body 5. Between this pair of the links 7a and 7b there is provided a connecting shaft 7d connecting them together. In addition, each end of the links 7a and 7b has an end stay 7c bent outwardly, which end stay 7c is adapted to engage the cutout stay 5d, formed in each of the side walls 5a and 5b of the body 5, when the fastening is released. Furthermore, each of the links 7a and 7b has its upper edge formed with an upper edge stay 7e bent outwardly, which upper edge stay 7e is adapted to engage an upper edge of the respective side wall 5a or 5b of the body when the fastening is effected.

The lever 6 is provided with a pair of opposite side walls 6a and 6b and a connecting wall 6c connecting these side walls 6a and 6b together, all integrally formed by metal press work. Exteriorly of the side walls 6a and 6b, ends of the links 7a and 7b are pivotally connected to the side walls 6a and 6b by means of respective pivot shafts 14a and 14b. It is to be noted that portions of the side walls 6a and 6b of the lever and of the side walls of the body 5 where the pivot shafts 14a and 14b are fitted are, as best shown in FIG. 4, somewhat outwardly bulged to avoid any possible interference of the inner ends of the pivot shafts 14a and 14b with a belt 2.

Between the pair of the side walls 6a and 6b is fixed a belt turning shaft 13 and a belt pressing shaft 12 rouletted.

Each end of the belt pressing shaft 12 and belt turning shaft 13 is fixed at a position somewhat inwardly of the edge of the corresponding side wall 6a or 6b, thereby forming a belt guide 6d around these shafts. Furthermore, between the side walls 6a and 6b is provided a connecting shaft 6i and an intermediate plate 6f opposing the connecting shaft 6i. This intermediate plate 6f is formed with a hole 6h facing the connecting shaft 6i, and a portion of the connecting wall 6c facing the intermediate plate 6f is formed with a hole 6e facing the hole 6h. These holes 6e and 6h are holes into which a fastening rod 15 as will be described below is inserted. It is to be noted that the side walls 5a and 5b have anchor projection 5c protruding inwardly at predetermined positions thereof, which anchor projections 5c are adapted to be received in respective recesses 6j formed in the side walls 6a and 6b of the lever 6 when the fastening is effected.

One end of the belt 2 forming an essential portion of the other connecting member A" is connected to the connecting shaft 9 while the other end of the belt 2 is passed between the guide shaft 10 and the connecting shaft 9, then turned around belt turning shaft 13 past belt pressing shaft 12, and finally led to the outside after having again passed between the belt guide shaft 10 and the connecting shaft 9. Accordingly, as best shown in FIG. 3, the belt 2 is double-layered at a portion of the belt pressing shaft 12. Nevertheless, a belt retainer plate 3 mounted on an end 2a of the belt 2 is not loaded at the time of insertion of the belt. This belt retainer plate 3 is removable relative to the belt end 2a and is in the form of a plate having on its face a pair of slots 3a and 3b. Thus, the belt end 2a is fixed by allowing it to pass through the slot 3a and, after having been turned backward, again through the slots 3b and 3a in sequence. To the belt 2 so loaded in the form of a loop as a whole in the manner described above is, as shown, connected a connecting member 11b, and to the connecting member 11b are connected links 11c and 11d through a pin 11a, to which link 11d a second hook 1b is connected through a pin 11e. It is to be noted that the connecting member 11b has a thick shaft 11g and a pair of small shafts 11f and 11f, the belt 2 being connected after having been turned around the thick shaft 11g, and the pair of small shafts 11f and 11f so regulating the belt 2, which has been double-layered turned around the thick shaft 11g, exteriorly to avoid any possible expansion of the loop of the belt 2 which may occur during the belt loosening.

Operating procedures of the clasping device of the construction described above are as follows.

FIG. 9 illustrates the release condition. In the release condition as shown in FIG. 9, the side of the lever 6 adjacent the connecting wall 6c is positioned leftwards and the pivot shafts 14a and 14b connecting the links 7a and 7b and the side walls 6a and 6b together project considerably upwardly from between the side walls 5a and 5b of the body 5. Engagement of the first and second hooks 1a and 1b to a cargo item or the fastening belt is performed during this release condition and, in this condition, any slackening of the belt 2 is eliminated by sufficiently pulling the end 2a of the belt 2. It is to be noted that, in this release condition of the lever 6, the end stays 7c of the links 7a and 7b engaged in the cutout stays 5d formed in the respective side walls 5a and 5b of the body 5 thereby preventing the lever 6 from being raised beyond a certain height.

The fastening procedure of this clasping device is carried out by the use of the fastening rod 15 as shown in FIG. 8. This fastening rod 15 has its tip 15a reduced somewhat in diameter and its stem portion formed with a circumference groove 15b. The tip 15a of this fastening rod 15 is, as shown in FIG. 8, inserted through the hole 6e in the lever and then the hole 6h in the intermediate plate 6f with its outermost tip 15c abutting the connecting shaft 6i. In the condition in which the fastening rod 15 is inserted in the lever 6, a shoulder 15d formed between the body of the fastening rod 15 and the reduced diameter tip 15a is held just in abutment with an external face of the connecting wall 6c, and the circumferential groove 15b is engaged with a peripheral portion of the hole 6e in the connecting wall 6c. The reason for the formation of the fastening rod 15 in the manner as hereinabove described is that, when the lever 6 is abruptly pivoted in the fastening direction by the tension acting on the belt 2, the circumferential groove 15b in the fastening rod 15 and the peripheral portion of the hole 6e in the connecting wall 6 are engaged with each other to avoid any possible accidental separation of the fastening rod 15.

When the lever 6 is moved to the fastening position shown in FIGS. 1, 2 and 3 by the use of the fastening rod 15, the pivot shafts 14a and 14b move in the direction in which they lie between the side walls 5a and 5b of the body 5, until the upper edge stays 7e of the respective links 7a and 7b abut upper edges of the side walls 5a and 5b of the body 5 and, accordingly, the possibility that portions of the lever 6 where the belt turning shaft 13 and the belt pressing shaft 12 are fixed project upwardly more considerably than during the release condition can be avoided, thereby permitting the lever 6 to be accomodated compactly in the body 5. This fastening condition of the lever 6 can be maintained with predetermined portions of the respective side walls 5a and 5b held in contact with the guide shaft 10 and also with the inwardly protruding anchor projections 15c, which are formed in the sidewalls 5a and 5b at predetermined positions, engaged in the corresponding recesses 6j which are formed in the side walls 6a and 6b at corresponding positions. It is to be noted that, in this fastening condition, since a tension portion of the belt 2 between the belt pressing shaft 12 and the connector 11b is positioned on one side of the center axis O of each pivot shafts 14a and 14b adjacent the belt pressing shaft 12 or the belt turning shaft 13, the lever 6 can be further moved in the fastening direction when a further tension comes to act on the belt 2 during the use, and accordingly, there is no possibility that the fastening is naturally released during the use.

Figure 10:
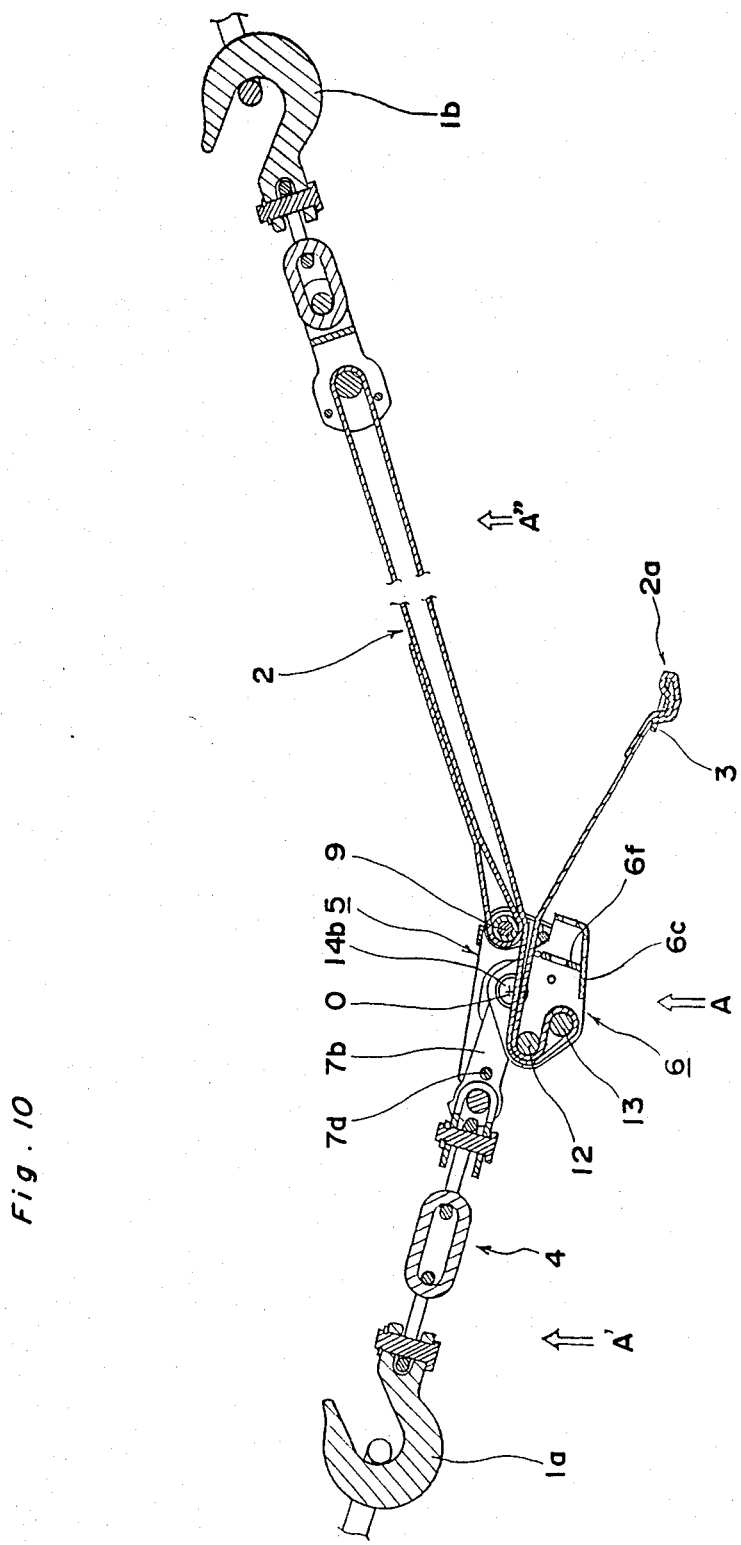
FIG. 10 is a sectional view showing the clasping device turned upside down because of the slackening of the belt.

In addition, as shown in FIG. 10, in the event that the clasping main A turns upside down during the use because of the slackening of the belt 2, the belt 2 separates away from the belt guide shaft 10 and then contact one side of the connecting shaft 9. However, even in this case, since the portion of the belt 2 between the connecting shaft 9 and the belt pressing shaft 12 is located on one side of the center axis O of each of the pivot shafts 14a and 14b adjacent the belt pressing shaft 12 or the belt turning shaft 13, there is no possibility of the lever naturally pivoting in the release direction even though any tension acts on the belt 2 as is the foregoing case.

Since in the main member A the lever 6 is pivotally connected to the body 5 not directly, but through the links 7a and 7b such that, when the lever 6 is positioned in the fastening position, the connecting shafts 14a and 14b connecting the lever 6 and the link 7a and 7b together move in the direction in which they move between the sidewalls of the body 5 and, consequently, the lever 6 can be accommodated compactly in the body 6 without considerably projecting upwardly from the body 5, the clasping device according to the foregoing embodiment has such an advantage that the length in a lateral direction of the body 5 can be minimized, thereby permitting the clasping main member A to be constructed compactly.

In addition, in the foregoing embodiment, since the belt 2 is formed into a loop, that is, double-layered, while the end 2b of the belt 2 is connected to the connecting shaft 9, the physical strength of the belt is increased correspondingly, and since the load applied to the belt 2 is distributed to upper and lower portions of the belt, elongation of the belt 2 between the body 5 and the second hook 1b can advantageously reduced by 50%.

Although in the foregoing the embodiment of the present invention has been described, it is needless to say that the present invention is not limited to the foregoing embodiment but various changes are apparent without departing from the scope of the present invention defined by the claim thereof. By way of example, it may be possible to connect the end 2b of the belt 2 directly to the connecting member 11, instead of connecting it to the connecting shaft 9.

I claim:
1. A clasping device, comprising
a lever having spaced apart first side walls having facing first interior sides and respective first exterior sides opposite said first interior sides;
a body having spaced apart second side walls having facing second interior sides and respective second exterior sides opposite said second interior sides;
a pair of spaced apart links, each having respective first and second ends;
pivot shafts, having a first pivot axis, pivotally connecting said pair of links at said first end to said first side walls of said lever at said first exterior sides;
a first connecting shaft having a second pivot axis, pivotally connecting said pair of links at said second end to said second side walls of said body at said second interior sides;
a first hook;
a connecting member connecting said hook to said first connecting shaft;
a belt turning shaft and a belt pressing shaft, each fixed between said first side walls of said lever;
a second hook outside said lever; and
a belt successively extending from one side of said belt outside of said lever, over said belt pressing shaft, turned about said belt turning shaft, and again extending over said belt pressing shaft to the other end of said belt outside said lever, said other end of said belt being coupled to said second hook;
said lever and said pair of links being respectively concurrently pivotable about said first and second pivot axes between a release position in which said belt is loose and said lever extends in the direction from said first end toward said second end outward of said body, and a fastening position in which said belt turning shaft and said belt pressing shaft are located farther from said second hook than in said release position so that in clasping use said belt is under tension, and in which said lever extends toward said second hook inside said body between said second side walls.

2. A clasping device as in claim 1, wherein said first side walls and said second side walls extend in vertical and lateral directions, said lateral direction being perpendicular to said vertical direction, said first and second axes extending in horizontal directions perpendicular said vertical and lateral directions, said belt extending in said lateral direction between said lever and said second hook when said lever and said pair of links are in said fastening position, said lever extending from said first end to said second end in said lateral direction when said lever and said pair of links are in said fastening position, said lever extending more vertically upward and said pivot shafts being located lower relative to said body, when said lever and said pair of links are in said release position than when in said fastening position.

3. A clasping device as in claim 2, wherein said pair of links have horizontally outwardly bent end stays defined at said first end, said second side walls of said body having cutout stays defined at ends thereof adjacent said end stays, said end stays engaging said cutout stays to limit pivotal movement of said pair of links during rotation of said pair of links and said lever from said fastening position toward said release position.

4. A clasping device as in claim 2, further comprising a second connecting shaft between said second side walls, said first and second connecting shafts being located at respective laterally opposite ends of said body at locations respectively closer to said first and second hooks, said other end of said belt being connected to said second connecting shaft.

5. A clasping device as in claim 2, wherein said pair of links have upper edge stays defined on upper edges thereof so as to bend outwards in said horizontal direction, said upper edge stays being adapted to engage upper edges of said second side walls of said body when said pair of links and said lever are in said fastening position.

6. A clasping device as in claim 2, wherein said lever has a connecting wall connecting said first side walls together, and an intermediate plate positioned between the first side walls and inwardly of the connecting wall, said connecting wall and said intermediate plate having respective holed in face-to-face relation, into which holes a fastening rod for pivoting said lever is adapted to be inserted.

7. A clasping device as defined in claim 6, further comprising a fastening rod having a circumferential groove defined on an insertion end thereof, into which circumferential groove a peripheral portion of the hole in the connecting wall of said lever is adapted to be engaged.

8. A clasping device as in claim 1, wherein said pair of links have horizontally outwardly bent end stays defined at said first end, said second side walls of said body having cutout stays defined at ends thereof adjacent said end stays, said end stays engaging said cutout stays to limit pivotal movement of said pair of links during rotation of said pair of links and said lever from said fastening position toward said release position.

9. A clasping device as in claim 1, further comprising a second connecting shaft between said second side walls, said first and second connecting shafts being located at respective opposite ends of said body at locations respectively closer to said first and second hooks, said other end of said belt being connected to said second connecting shaft.

10. A clasping device as in claim 1, wherein said lever has a connecting wall connecting said first side walls together, and an intermediate plate positioned between the first side walls and inwardly of the connecting wall, said connecting wall and said intermediate plate having respective holes in face-to-face relation, into which holes a fastening rod for pivoting said lever is adapted to be inserted.

11. A clasping device as defined in claim 10, further comprising a fastening rod having a circumferential groove defined on an insertion end thereof, into which circumferential groove a peripheral portion of the hole in the connecting wall of said lever is adapted to be engaged.

* * * * *